Patented Oct. 11, 1938

2,132,619

UNITED STATES PATENT OFFICE 2,132,619

PROCESS OF COLORING OXIDE FILMS ON ALUMINUM AND ITS ALLOYS

Frederick Hill and Jack Augustus Radley, Manchester, England, assignors to Imperial Chemical Industries Limited, a corporation of Great Britain No Drawing. Application December 20, 1937, Serial No. 180,917. In Great Britain December 22, 1936

5 Claims. (Cl. 148—6)

This invention relates to the dyeing of artificial oxide films produced on aluminum or its alloys, for instance, those alloys containing 5% or less of silicon, copper, magnesium, zinc and other metals. The oxide film may be produced by any convenient means, for instance, by physical methods such as subjecting the aluminum to electrolytic surface oxidation or by chemical means, for instance, by treating it in acid or alkaline baths with salts of chromic acid or hydrofluoric acid.

This invention has as an object to devise new methods of dyeing such artificial oxide films. A further object is to devise methods of dyeing such films so as to give good tinctorial strength and fastness to light. A further object is to produce colored artificial oxide films which have good tinctorial strength and fastness to light.

Further objects will appear hereinafter. These objects are accomplished by the following invention.

We have discovered that such artificial oxide films, however obtained, may be conveniently and efficiently colored by treatment with a dyebath in which is dissolved an azo or anthraquinone dyestuff containing a hydroxyalkyl sulphuric ester group attached to an aromatic nucleus through an N or O atom and devoid of nuclear sulphonic or carboxylic groups.

The following examples serve to illustrate but do not limit the invention. The parts are by weight.

Example 1

1 part of the dyestuff p-nitraniline→N-ethyl-N-β-hydroxyethylaniline sulphuric ester (see British specification 237,739) is dissolved in 1500 parts of water and 1.5 parts of acetic acid added. Anodized aluminum is immersed in this bath, the temperature of which is then raised to the boil and maintained there for 20 minutes, after which the aluminum is removed, washed and dried. It is colored a deep scarlet color of good fastness to light.

Example 2

1 part of the dyestuff, 2:4-dinitroaniline→N-ethyl-N-β-hydroxyethylaniline sulphuric ester (see British specification 237,739) is dissolved in 3000 parts of water containing 3 parts of acetic acid. After immersion of the anodized aluminum in the liquid the temperature is raised to the boil and maintained there for 15 minutes. The aluminum is dyed a reddish-violet color.

Example 3

1 part of the dyestuff p-aminophenyl-β-hydroxyethyl ether sulphuric ester→p-cresol (see British specification 441,089) is dissolved in 1500 parts of water containing 1.5 parts of acetic acid. Anodized aluminum is dyed for 15 minutes at the boil and acquires a strong yellow color.

Example 4

1 part of the dyestuff, the sodium salt of the sulphuric ester of 1-methylamino-4-β-hydroxyethylamino anthraquinone is dissolved in 1500 parts of water containing 1.5 parts of acetic acid. Anodized aluminum is dyed in this solution for 15 minutes at the boil and acquires a strong blue color of excellent light fastness.

The dyestuffs may be applied from a neutral bath containing Glauber's salt or from an acid bath containing, e. g. acetic acid. The temperature of the dyebath may vary in wide limits, depending on the type of oxidized film being dyed. As dyebath there may be employed any convenient solution of the dyestuff, for instance, in water, alcohol or acetone. The color may also be applied by brushing, by spraying, or may be printed on from aqueous dye pastes.

Instead of the p-nitraniline→N-ethyl-N-β-hydroxyethylaniline sulphuric ester of Example 1 there may be used the sulphuric ester obtained by treating the disazo dyestuff p-aminophenyl-β-hydroxyethyl ether→2:5-dimethoxyaniline→phenol, with sulphuric acid or the compound p-aminophenyl-β-sulphatoethyl ether→m-toluidine→phenol.

The shades obtained are bright and of good fastness to light and the tinctorial power of such applied dyestuff is high. Thus, for instance, shades of good depth may be obtained from a bath containing 0.2–0.6 gram of dyestuff per litre of dye liquor, whereas with the usual acid or chrome dyestuffs of similar dyestuff content a considerably larger quantity is required to produce a like depth of shade.

A further advantage of this process is that these dyestuffs all dye the oxide film at approximately the same rate, which makes it easier to use mixtures of the dyes. A still further advantage is that when mixtures are used, we get no differential fading of the colors on exposure to light.

As many apparently widely different embodiments of this invention may be made without departing from the spirit and scope thereof, it is to be understood that we do not limit ourselves to the specific embodiments thereof except as defined in the appended claims.

We claim:

1. Process for the coloration of artificial oxide films on metals of the class consisting of aluminum and its alloys by treatment with a dyebath containing a dyestuff of the class consisting of azo and anthraquinone dyestuffs which dyestuff contains a hydroxy-alkyl sulphuric ester group attached to an aromatic nucleus through an atom of the class consisting of nitrogen and oxygen and which dyestuff is devoid of any nuclear sulphonic and nuclear carboxylic groups.

2. Artificial oxide films whenever colored by the process claimed in claim 1.

3. A process as described in claim 1 in which the dyestuff used in the dyebath is obtained by coupling diazotized p-nitraniline with N-ethyl-N-beta-hydroxyethylaniline sulphuric ester as described in British specification 237,739.

4. A process as described in claim 1 in which the dyestuff used in the dyebath is obtained by coupling diazotized 2:4-dinitroaniline with N-ethyl-N-beta-hydroxy ethylaniline sulphuric ester as described in British specification 237,739.

5. A process as described in claim 1 in which the dyestuff used in the dyebath is the sodium salt of the sulphuric ester of 1-methylamino-4-beta-hydroxyethylamino anthraquinone.

FREDERICK HILL.
JACK AUGUSTUS RADLEY.